(12) United States Patent
Fenny et al.

(10) Patent No.: US 10,427,780 B2
(45) Date of Patent: Oct. 1, 2019

(54) ELECTRIC COLD FLOW TIPJET ROTORCRAFT

(71) Applicant: Bell Helicopter Textron Inc., Fort Worth, TX (US)

(72) Inventors: Carlos A. Fenny, Fort Worth, TX (US); Daniel B. Robertson, Southlake, TX (US); Kirk L. Groninga, Keller, TX (US); Troy C. Schank, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 639 days.

(21) Appl. No.: 15/298,959

(22) Filed: Oct. 20, 2016

(65) Prior Publication Data

US 2018/0111680 A1    Apr. 26, 2018

(51) Int. Cl.
*B64C 27/02* (2006.01)
*B64C 27/18* (2006.01)
(Continued)

(52) U.S. Cl.
CPC .......... *B64C 27/025* (2013.01); *B64C 27/18* (2013.01); *B64C 27/82* (2013.01); *B64D 27/02* (2013.01);
(Continued)

(58) Field of Classification Search
CPC ............ B64C 27/18; B64C 2027/8209; B64C 2027/8236
See application file for complete search history.

(56) References Cited

U.S. PATENT DOCUMENTS 2,330,056 A   9/1943   Howard
2,540,190 A   2/1951   Doblhoff
(Continued)

FOREIGN PATENT DOCUMENTS

CA    2207663 A1   6/1997
CH    422531 A    10/1966
(Continued)

OTHER PUBLICATIONS

European Search Report, dated Oct. 26, 2017, by the European Patent Office, in connection with EP Patent Application No. 17168208.1.

(Continued)

*Primary Examiner* — Philip J Bonzell
*Assistant Examiner* — Tye William Abell
(74) *Attorney, Agent, or Firm* — Timmer Law Group, PLLC

(57) ABSTRACT

A rotorcraft capable of a hover mode and a forward cruise mode including a fuselage, a first electric propulsion system, a second electric propulsion system, and an electric power control unit to control power to the first and second electric propulsion systems in the hover and forward cruise modes. The first electric propulsion system is a tip jet cold flow system that imparts rotation on a pair of rotor blades disposed above a top surface of the fuselage, and a first electric motor configured to drive the tip jet cold flow system. The second electric propulsion system includes a propeller disposed in the rear of the fuselage and a second electric motor configured to drive the propeller.

20 Claims, 4 Drawing Sheets

(51) Int. Cl.
  *B64C 27/82* (2006.01)
  *B64D 27/24* (2006.01)
  *B64F 1/36* (2017.01)
  *B64D 27/02* (2006.01)
(52) U.S. Cl.
  CPC .............. *B64D 27/24* (2013.01); *B64F 1/362* (2013.01); *B64C 2027/8209* (2013.01); *B64C 2027/8236* (2013.01); *B64D 2027/026* (2013.01); *Y02T 50/44* (2013.01); *Y02T 50/64* (2013.01)

(56) References Cited

U.S. PATENT DOCUMENTS

| | | | | |
|---|---|---|---|---|
| 3,866,415 | A * | 2/1975 | Ciokajlo | F01D 7/00 60/226.1 |
| 4,473,335 | A * | 9/1984 | Henry | B64C 27/18 416/148 |
| 5,174,523 | A * | 12/1992 | Balmford | B64C 27/12 244/17.11 |
| 6,729,577 | B2 | 5/2004 | Morgenstern | |
| 9,145,831 | B1 | 9/2015 | White | |
| 9,174,731 | B2 | 11/2015 | Ross et al. | |
| 2004/0025495 | A1 | 2/2004 | Dev | |
| 2007/0012026 | A1 | 1/2007 | Dev | |
| 2013/0147204 | A1 * | 6/2013 | Botti | B64D 27/24 290/1 A |
| 2013/0161444 | A1 | 6/2013 | Spanos et al. | |
| 2015/0097530 | A1 * | 4/2015 | Scarlatti | B60L 11/1827 320/109 |
| 2015/0344132 | A1 | 12/2015 | Jeney et al. | |
| 2016/0052626 | A1 | 2/2016 | Vander Mey | |
| 2016/0090174 | A1 | 3/2016 | White | |
| 2016/0229531 | A1 | 8/2016 | Robertson et al. | |

FOREIGN PATENT DOCUMENTS

| | | | |
|---|---|---|---|
| CH | 422531 | A * | 4/1967 |
| DE | 102010021026 | A1 | 11/2011 |
| EP | 1780387 | A2 | 2/2007 |
| EP | 3312087 | B1 | 3/2019 |
| GB | 632065 | A | 11/1949 |
| GB | 957153 | A | 5/1964 |
| WO | 1996018024 | A1 | 6/1996 |
| WO | 2002035072 | A2 | 5/2002 |
| WO | 2014075706 | A1 | 5/2014 |

OTHER PUBLICATIONS

VFW H3-E Sprinter Compound Helicopter VTOL; Straight Up, Ch. 2 Compound (Unloaded-Rotor) VTOL; pp. 20, 21.
Photos of Volocopter VC200, Sud-Ouest SO 1221 Djinn, Turbomeca Palouste, Sud-Ouest SO.1310 "Farfadet," Autogyro ArrowCopter AC20.
EP Communication under Rule 71(3) EPC, dated Jun. 26, 2018, by the EPO, re EP Patent App No. 17168208.1.
Examination Report, dated Nov. 16, 2017, by the EPO, in connection with EP Application No. 17168208.1.
Decision to Grant, dated Feb. 14, 2019, by the EPO, re EP Patent App No. 17168208.1.

* cited by examiner

ELECTRIC COLD FLOW TIPJET ROTORCRAFT

BACKGROUND

Technical Field

The present disclosure relates generally to an electric rotorcraft, and more particularly, to an electric tip jet rotorcraft with a propeller.

Description of Related Art

Rotorcraft such as helicopters are conventionally powered mechanically by an engine transmitting power via mast to the main rotor blades. Unlike conventional helicopters, a tip jet helicopter uses pressurized gases discharged out of the tip of the rotor blades to impart rotation on the rotor blades.

Several versions of combustion powered or "hot-flow" tip jet helicopters have been developed in the past. One example is a tip jet driven by a ram jets located at the tips of the rotor blades; this configuration has a high fuel consumption and a limited range for flight. Another example is a fuel/air fed through hollow rotor blades using a compressor driven by an aircraft engine and that is ignited by a tips of the blades; the combustion at the tips of the blades is loud and bright at night.

A "cold-flow" tip jet helicopter called a SO 1221 Djinn was developed that has a rotor with two hollow blades. A modified turbo shaft engine with an air compressor supplies a combustion chamber of a central engine. Most of the compressed air exiting the air compressor is ducted to a hollow oscillating rotor hub, then passes through longitudinal passages of the hollow rotor blades. The compressed air is then discharged by nozzles located at the tip of the blades. The primary disadvantage to the SO 1221 Djinn was the low fuel efficiency and low top speed compared with conventional mechanical helicopters.

Electric propulsion systems have also been considered for conventional rotorcraft. However, a conventional rotorcraft such as a helicopter or proprotor type plane requires a large powerful battery, which increases weight and reduces efficiency of flight as compared to a combustion powered rotorcraft. Battery energy density and electric motor power density are not adequate for commercial vertical flight of a conventional helicopter.

There is a need for an improved cold flow tip jet rotorcraft that is powered by at least one electric propulsion system.

SUMMARY

In a first aspect, there is provided a rotorcraft capable of a hover mode and a forward cruise mode including a fuselage having a top surface and a rear end, a first electric propulsion system, a second electric propulsion system, and an electric power control unit to control power to the first and second electric propulsion systems in the hover and forward cruise modes.

An embodiment provides that the first electric propulsion system includes an air compressor, the air compressor having an inlet for receiving ambient air and an outlet for releasing compressed air, a first electric motor configured to drive the air compressor, a pair of rotor blades disposed above the top surface of the fuselage, the rotor blades comprising a hollow portion; and a conduit in fluid communication with the air compressor outlet and the hollow portion of the rotor blades. The compressed air flows from the air compressor outlet into the conduit and into the hollow portion of the rotor blades, the compressed air is then discharged from the hollow portion of the rotor blades to impart rotation thereon during hover mode.

An embodiment also provides that the second electric propulsion system including a propeller disposed in the rear second electric motor, and a second electric motor configured to drive the propeller.

In another embodiment, the air compressor is disposed adjacent to the top surface of the fuselage.

In one example, the rotorcraft also includes a hollow rotating hub in fluid communication with the conduit and the pair of hollow rotor blades. In another example, the hollow rotating hub is a pneumatic slip ring.

In an example, the hollow rotor blades receive only compressed air during operation of the first electric propulsion system.

In still another example, the rotorcraft includes a battery in electrical communication with the electric power control unit and an electric power connector disposed on the fuselage, the electrical power connector configured to receive electrical current from an independent power source to charge the battery.

In another embodiment, the electric power connector is a quick release power connector. In one embodiment, the quick release power connector is controlled remotely for disconnection from the independent power source.

In yet another example, the electric power connector is connected to the independent power source while the pair of rotor blades are rotating.

In an example, the electric power control unit provides more power to the first electric propulsion system during the hover mode as compared to the second electric propulsion system.

In still another example, the electric power control unit provides more power to the second electric propulsion system during the cruise mode as compared to the first electric propulsion system.

In another example, the electric power control unit provides all power to the second electric propulsion system.

In an example, the second electric propulsion system further includes a combustion engine in mechanical communication with the second electric motor and the propeller.

In another example, the electric power control unit provides power to the first electric propulsion system and the combustion engine during the hover mode.

In still another example, the lift for a flight mode is achieved only by at least one of the first electric propulsion system and the second electric propulsion system.

In a second aspect, there is a method of controlling a rotorcraft, the rotorcraft including a fuselage having a top surface and a rear end, a first electric propulsion system including a tip jet cold flow system that imparts rotation, on a pair of rotor blades, disposed above the top surface of the fuselage, and a first electric motor configured to drive the tip jet cold flow system, and a second electric propulsion system including a propeller disposed in the rear of the fuselage; and a second electric motor configured to drive the propeller. The method includes a hovering mode, in which the lift of the rotorcraft is generated by the first electric propulsion system and the yaw position of the aircraft is controlled by the second electric propulsion system, and a cruising mode, in which the forward thrust of the rotorcraft is generated by the second propulsion system and at least in part by an autogyro motion of the pair of rotor blades.

In one embodiment, the rotorcraft includes a battery for providing power to the first and second electric propulsion systems, and an electric power control unit to control power from the battery to the first and second electric propulsion systems in the hover and forward cruise modes.

In another embodiment, the hovering mode includes a vertical takeoff mode, where the first electric propulsion system is powered from an independent power source and charging the battery while the rotorcraft is on the ground.

In one embodiment, a descent mode is provided, in which the lift of the rotorcraft is generated by the first electric propulsion system, the yaw position of the aircraft is controlled by the second electric propulsion system, and at least in part by an autogyro motion of the pair of rotor blades.

In still another embodiment, the second propulsion system further includes a combustion engine in mechanical communication with the second electric motor and the propeller.

In yet another embodiment, a vertical takeoff mode is provided, in which the lift of the rotorcraft is generated by the first electric propulsion system and the second propulsion system, and the yaw position of the aircraft is controlled by the second electric propulsion system.

Other aspects, features, and advantages will become apparent from the following detailed description when taken in conjunction with the accompanying drawings, which are a part of this disclosure and which illustrate by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
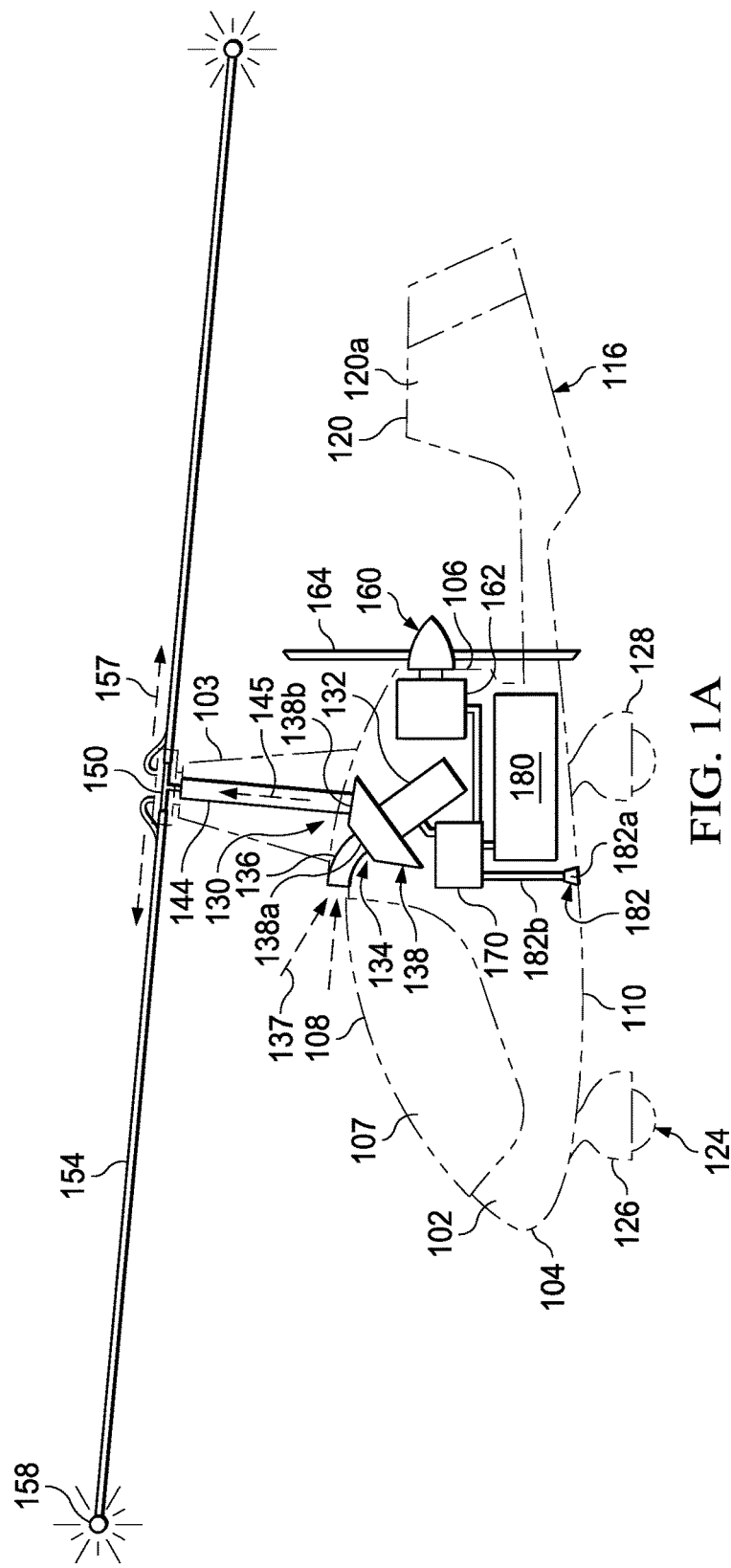
FIG. 1A is a schematic side view of a rotorcraft, according to one example embodiment.

FIG. 1A shows a rotorcraft 100 according to one example embodiment. Rotorcraft 100 features a fuselage 102, a mast 103, a tail member 116, landing gear 124, a first electric propulsion system 130, a second electric propulsion system 160, an electric power control unit 170, a battery 180, and an electric power connector 180.

Figure 1B:
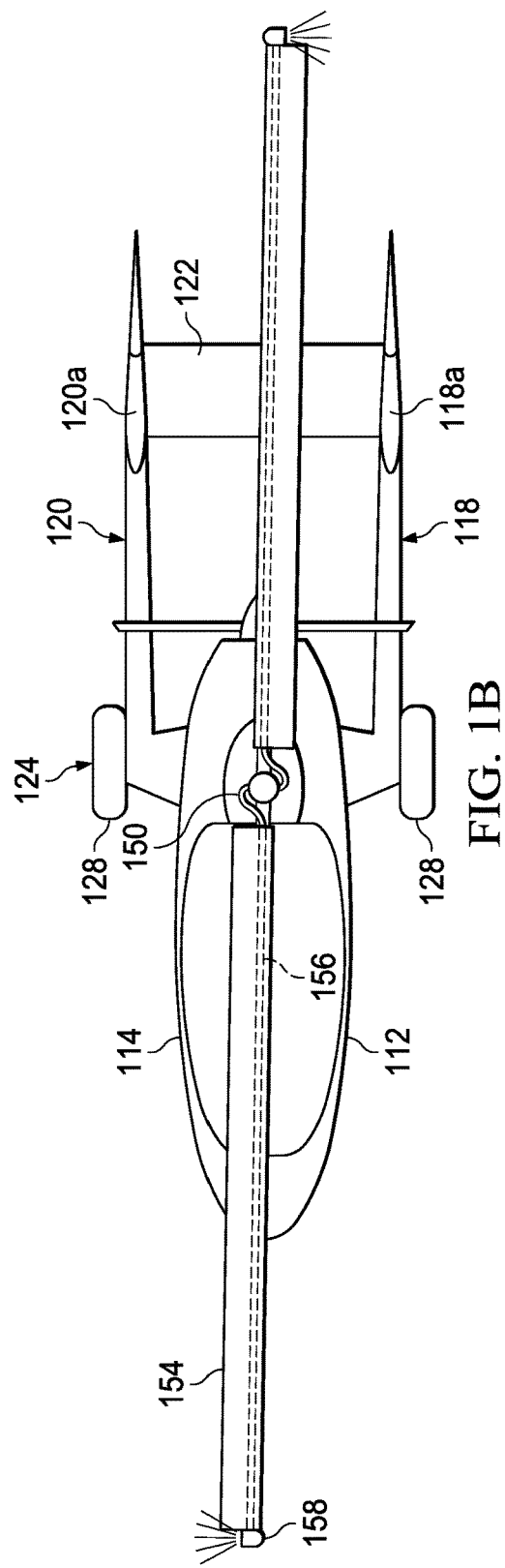
FIG. 1B is a top view of the rotorcraft in FIG. 1, according to one example embodiment.

The rotorcraft schematically shown in FIGS. 1A and 1B includes a central main body as the fuselage 102. The fuselage extends along the longitudinal axis 20 from a fuselage front end 104 to a fuselage rear end 106. In an embodiment, a cabin 107 is included in the fuselage. The fuselage front end 104 points into the forward direction of the rotorcraft 100. The fuselage includes a top surface 108, a bottom surface 110, first side surface 112 and second side surface 114.

The tail member 116 includes a first vertical tail 118, a second vertical tail 120, and a horizontal tail 122. The first and second vertical tails 118 and 120 are each respectively each mounted to the first and second side surfaces 112 and 114 of the fuselage. The aft portion of the first and second vertical tails 118 and 120 are connected by the horizontal tail 122 to for a pi-tail configuration. The first and second vertical tails 118 and 120 and the horizontal tail 122 are stabilizing airfoils. In another embodiment, the horizontal tail 122 is disposed on an upper portion 118a and 120a, respectively, of the first and second vertical tails 118 and 120.

The landing gear 124 includes a front landing gear 126 and rear landing gear 128. The front land gear 126 is positioned on a lower surface of the front fuselage 102. The front landing gear 126 is positioned on the fuselage in an area as far to the front as possible, for reasons of loading the front wheel relative to the rear landing gear 128. The rear landing gear 128 is a pair of landing gear disposed respectively on the first and second vertical tails 118 and 120 adjacent to the fuselage 102 as shown in FIG. 1B.

The first electric propulsion system includes a first electric motor 132, an air compressor system 134, a conduit 144, a rotating hub 150, and a pair of blades 154. The first electric propulsion system 130 is a tip jet cold flow system involving compressed air only. Combustible fuel is not used or burned by the first electric propulsion system 130. Air traveling in the first electric propulsion system is air only; no combustible components are mixed with the air in the first electric propulsion system 132. The air in the first electric propulsion system 132 enters at an ambient temperature and increases in temperature as it compresses in the air compressor system 134. The air in the first electric propulsion system 132 is not flowed over a heat exchanger or other heating component.

The first electric motor powers 132 the first electric propulsion system 130. The first electric engine 132 is a high speed electric motor that operates at about 30,000 to about 40,000 RPM during operation. In another embodiment, the first electric engine 132 is a high speed electric motor that operates at about 5,000 to about 70,000. An embodiment provides that the first electric motor 132 is a synchronous electric motor. In another embodiment, the first electric motor 132 is at least one of a brushed direct current motor, a brushless direct current motor, and a Halbach array electric motor. In another embodiment, the first electric motor 132 is a high RPM low torque electric motor. In one example, the first electric motor 132 is a NeuMotors electric ducted fan application brushless direct current motor manufactured by Neutronics, Inc.

The first electric motor 132 is in mechanical communication with the air compressor system 134 disposed in an upper portion of the fuselage 102. The air compressor system 134 includes an inlet 136 and a turbine air compressor 138 having an inlet 138a for receiving ambient air from the inlet 136 and an outlet 138b for releasing compressed air into the conduit 144. The inlet 136 is disposed on an upper surface of the fuselage 102 and adjacent to the mast 103. During operation of the air compressor system 134, the turbine air compressor 138 creates a suction effect to draw air into the inlet 136 as shown by arrows 137, compresses the air, and discharges the compressed air into conduit 144 as shown by arrow 145. The air conduit 144 is disposed within the mast 103 and is oriented generally perpendicular to the longitudinal axis 20.

The compressed air then travels up the air conduit 144 through the hollow rotating hub 150 and into the hollow channel 156 of the rotor blades 154. In one embodiment, the rotating hub 150 is a pneumatic slip ring. The compressed air travels through the hollow channel 156 as indicated by arrows 157 and out of a tip jet 158 located at the distal end of each of the rotor blades 154 to impart rotation thereon. The tip jet 158 is oriented at about 90 degrees from the longitudinal axis of the rotor blades 154 as shown in FIG. 1A.

In another embodiment, the rotor blades 154 includes more than two rotor blades, for example, and not limitation, 3 blades, 4 blades, 5 blades, or more. The cyclic and collective pitch control for the rotor blades 154 is provided by conventional helicopter control systems.

The second electric propulsion system 160 is included in rotorcraft 100 to reduce energy consumption during flight and achieve higher speed forward flight. The second electric propulsion system 160 is oriented parallel to the longitudinal axis 20 and includes a second electric motor 162 in mechanical communication with a propeller 164 disposed in the rear end 106 of the fuselage 102.

The second electric motor 162 is a high torque electric motor that cycles at a low speed from greater than 0 to about 10,000 RPM during operation. In another embodiment, the second electric motor 162 cycles at a low speed from about 2,000 to about 3,000 RPM during operation. An embodiment provides that the second electric motor 162 is a synchronous electric motor. In another embodiment, the second electric motor 162 is at a brushed direct current motor. In another embodiment, the second electric motor 162 is a low speed electric motor. In one example, the second electric motor 162 is manufactured by Joby with the JM2S model number.

The propeller 164 powers the rotorcraft 100 for cruise flight mode to reduce power requirements by more than half compared to conventional helicopters that use an engine to directly power rotor blades mechanically through the rotor mast. The propeller 164 provides forward thrust during a cruise or transitional mode and provides yaw control by direct a low thrust flow over horizontal tail 122. In another embodiment, a gearbox is provided between the second electric motor 162 and the propeller 164 to provide a gear reduction.

The first and second electric propulsion systems 130 and 160 are monitored and controlled by the electric power control unit (EPCU) 170 to ensure that a safe speed is maintained in a particular flight mode. The EPCU 170 monitors and controls speed of the respective motors 132 and 162 in the first electrical propulsion system 130 and the second electrical propulsion system 160 to ensure efficient and functional energy usage and to maintain safe rotor speed.

The power to the EPCU 170 is provided by a battery 180. An embodiment includes an electric power connector 182 to EPCU 170 to allow the EPCU to monitor battery charging. In one embodiment, the electric power connector 182 is a quick release power connector that can be a cable 182b with a connector 182a for mechanically connecting with an independent ground power source 184 therewith. The electric power connector 182 can be connected with the independent ground power source 184, shown in FIG. 3, for powering up of the rotorcraft 100 and charging battery 180. For example, and not limitation, the total stored energy of the rotorcraft 100 is maximized by spinning up of the first propulsion system 130 prior to takeoff. Once the battery 180 is fully charged and the first propulsion system 130 is at takeoff speed, the electric power connector 182 is released from a ground power source 184 just prior to takeoff to provide a maximum amount of electrical and inertial energy stored on the rotorcraft 100.

In an embodiment, the electric power connector 182 is a quick release power connector that can remotely disconnected to allow the pilot or the ground crew to safely disconnect from the ground power source 184 from inside the fuselage 102 or at a safe distance, respectively, from the rotorcraft 100 that may include turning rotor blades 154 and propeller 164 in preparation for takeoff. The electric power connector 182 is a quick release power connector that can be controlled remotely. The electrical power connector 182 can include an integrated remote disconnect mechanism, for example, but not limitation, a cable 182b with a disconnect control 182a in electro-mechanical communication with the cable 182b. The disconnect control 182a can include a control lever for pivoting and pushing or otherwise disengaging the ground power source 184 from the electric power connector 182. In one embodiment, the disconnect control 182a can be electromechanically powered and controlled by a switch in the cabin 107. In another embodiment, the disconnect control 182a can be electromechanically powered and controlled by a switch in electromechanical communication with the independent power source 184 for disconnect from the ground crew.

Figure 2:
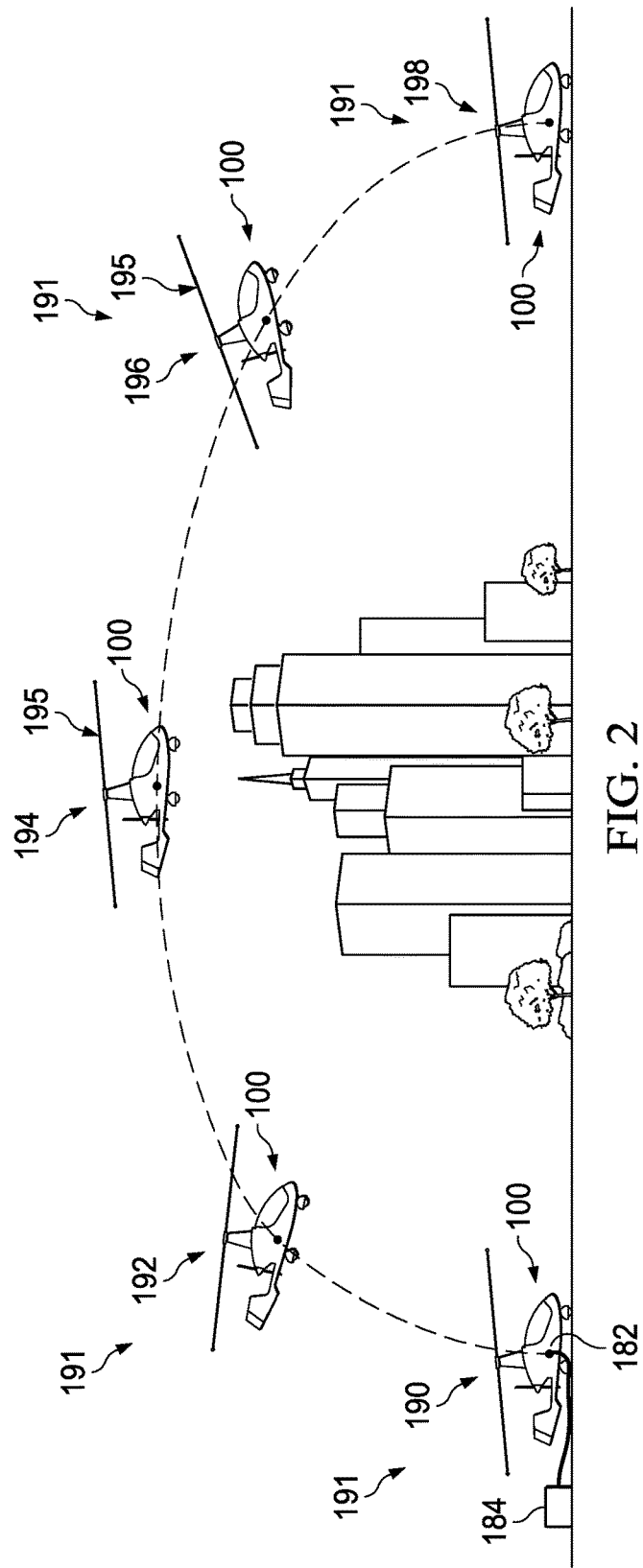
FIG. 2 is schematic overview diagram illustrating the modes of flight for a rotorcraft, according to one example embodiment.

Now referring to FIG. 2, in some embodiments, operation of rotorcraft 100 can be organized by two flight modes a hover mode 191 and a forward cruise mode 194. The hover mode 191 includes a vertical takeoff mode 190, ascent mode 192, descent mode 196, and vertical landing mode 198.

In vertical takeoff mode 190, the rotorcraft 100 is powered by the ground power source 184 to charge the battery 180 and to spin up and maintain the rotor 196 at full takeoff RPM until flight clearance is received. The EPCU 170 monitors and controls power to operate the first and second electric propulsion systems 130 and 160 for takeoff. The first electric motor 132 operates at a high power to drive the air compressor 134. The air compressor 134 forces compressed air through the conduit 14, the rotating hub 150, and the hollow channel 156 of the rotor blades 154. The compressed air is ultimately forced out of the tip jets 158 on either side of the rotor blades and imparts rotation thereto to achieve a max inertia speed required for takeoff. The vertical takeoff mode 190 requires the maximum power required by the first electric propulsion system 130 of all the flight modes. The second electric propulsion system 160 operates at low speed for yaw control during vertical takeoff mode 190 by directing a low thrust of air flow over the tail member 116.

In an embodiment, the first electric propulsion system 130 provides about 100 percent of the power to achieve lift during the vertical takeoff mode 190. The motor 164 in the second electric propulsion system 160 is operated at about 5 to about 10 percent of total power to maintain yaw control during vertical takeoff mode 190.

In another embodiment, the first electric propulsion system 130 operates for a limited time in vertical takeoff mode 190 to conserve battery power. In one embodiment, the vertical takeoff mode 190 is less than five minutes. In another embodiment, the vertical takeoff mode 190 is from about 15 seconds to 90 seconds. In yet another embodiment, the vertical takeoff mode 190 is from about 30 seconds to 90 seconds.

In one embodiment, the rotorcraft 100 can achieve a running takeoff on a compact runway having less than 400 feet of running distance.

The ascent mode 192 is a transition flight mode between vertical takeoff mode 190 and cruise mode 194. In ascent mode 192, the EPCU 170 monitors and controls power to both the first and second electric propulsion systems 130 and 160. The first electric propulsion system 130 with tip jets 158 and rotor blades 154 provide lift to climb vertically. The second electric propulsion system 160 operates at increasing power to accelerate the aircraft to cruise speed needed in cruise mode 194. Yaw control during ascent mode 192 is primarily provided by forward flight of air flow over the tail member 116. When the rotorcraft 100 has accelerated to above 15 knots airspeed the power to the first, electric propulsion system 130 is progressively reduced to zero as the second electric propulsion system 160 is increased to accelerate the rotorcraft 100 to the cruise speed needed in cruise mode 194.

The period of time the first electric propulsion system 130 operates is dependent on the altitude the rotorcraft 100 achieves to safely clear any obstacles in forward flight. If there are no obstacles present, the first electric propulsion system 130 may operate for less than 5 seconds before the second electric propulsion system 160 is fully powering the rotorcraft 100 and achieving cruise mode 194. When operating in a confined area, for example, a dense city center with tall buildings, operation of the first electric propulsion system 130 may be required for minutes prior to second propulsion system 160 is fully powering the rotorcraft 100 and achieving cruise mode 194. To minimize battery 180 energy consumption, the EPCU 170 monitors rotorcraft 100 speed and altitude to efficiently control power to either or both of the first and second electric propulsion systems 130 and 160 as required for flight.

In an embodiment, the first electric propulsion system 130 operates for a limited time in ascent mode 192 to conserve battery power. In one embodiment, the ascent mode 192 is less than five minutes. In another embodiment, the ascent mode 192 is from about 15 seconds to 90 seconds. In yet another embodiment, the ascent mode 192 is from about 30 seconds to 90 seconds.

In cruise mode 194, the EPCU 170 monitors and controls power to the second electric propulsion system 160. The second electric motor 162 powers the propeller 164 for forward flight at a full speed that can range from about 15 knots to about 100 knots. The air compressor system 134 is not operational during cruise mode 194 and does not impart rotation onto the rotor blades 154. The rotor blades 154 rotate in cruise mode 194 in an autogyro motion 195 because of forward flight provided by the second electric propulsion system 160. The autogyro motion 195 of the rotor blades 154 provides an additional lift without requiring power from the air compressor system 134, which surprisingly reduces the power needed for cruise mode 194 as compared to other conventional rotorcraft. The reduced power consumption provided by the autogyro motion of the rotor blades 154 can extend the range of the rotorcraft 100. Additionally, the battery 180 can have a reduced footprint and weight as compared to conventional battery powered rotorcraft.

In one embodiment, the first electric propulsion system 130 provides none of the power for cruise mode 194. In an embodiment, the second electric propulsion system 160 provides about 100 percent, or all of the power for cruise mode 194.

One benefit of having a first electric propulsion system 130 and a second propulsion system 160 is that the power requirements for cruise mode 194 are reduced by more than half as compared to powered conventional rotor helicopters.

An embodiment provides that in the event the second electric propulsion system 160 fails to operate in cruise mode 194, the first electrical propulsion system 130 and the autogyro motion 195 and associated inertia can provide a safe vertical landing in vertical descent mode 196 and vertical landing mode 198.

The vertical descent mode 196 is a transition flight mode where the rotorcraft 100 transitions from cruise mode 194 to vertical landing mode 198. In vertical descent mode 196, the EPCU 170 monitors and controls power to the first and second electric propulsion systems 130 and 160. Kinetic energy from the autogyro motion 195 is imparted onto the rotor blades 154, which reduces energy consumption during the descent mode 196. The first electric propulsion system 130 with tip jets 158 and rotor blades 154 is progressively engaged to provide controlled lift in a vertical orientation to prepare for vertical landing mode 198. The second electric propulsion system 160 power is decreased from full cruise mode 194 to the minimum power required for yaw control during descent mode 196 by directing a low thrust of air flow over the tail member 116.

The first electric propulsion system 130 provides about 100 percent of the power for the vertical descent mode 196. The motor 164 in the second electric propulsion system 160 is operated at about 5 to about 10 percent of total power to maintain yaw control during vertical descent mode 196.

In an embodiment, the first electric propulsion system 130 operates for a limited time in vertical descent mode 196 to conserve battery power. In one embodiment, the vertical descent mode 196 is less than five minutes. In another embodiment, the vertical descent mode 196 is from about 15 seconds to 90 seconds. In yet another embodiment, the vertical landing mode 196 is from about 30 seconds to 90 seconds.

In vertical landing mode 198, the EPCU 170 monitors and controls power to the first and second electric propulsion systems 130 and 160. Kinetic energy from the autogyro motion 195 is imparted onto the rotor blades 154, which reduces energy consumption during the vertical landing mode 198. The first electric propulsion system 130 with tip jets 158 and rotor blades 154 provide controlled lift in a vertical orientation to prepare for landing. The second electric propulsion system 160 operates at low speed for yaw control during vertical landing mode 198 by directing a low thrust of air flow over the tail member 116.

The first electric propulsion system 130 provides about 100 percent of the power for the vertical landing mode 198. The motor 164 in the second electric propulsion system 160 is operated at about 5 to about 10 percent of total power to maintain yaw control during vertical landing mode 198.

In an embodiment, the first electric propulsion system 130 operates for a limited time in vertical landing mode 198 to conserve battery power. In one embodiment, the vertical landing mode 198 is less than five minutes. In another embodiment, the vertical landing mode 198 is from about 15 seconds to 90 seconds. In yet another embodiment, the vertical landing mode 198 is from about 30 seconds to 90 seconds.

An embodiment provides that in the event the first electric propulsion system 130 fails to operate in vertical descent mode 196 or vertical landing mode 198, the autogyro motion 195 and associated inertia in combination with the powered second electric propulsion system 160 can provide a safe runway landing; for example, but not limitation, on a runway of about 500 feet in length.

Figure 3:
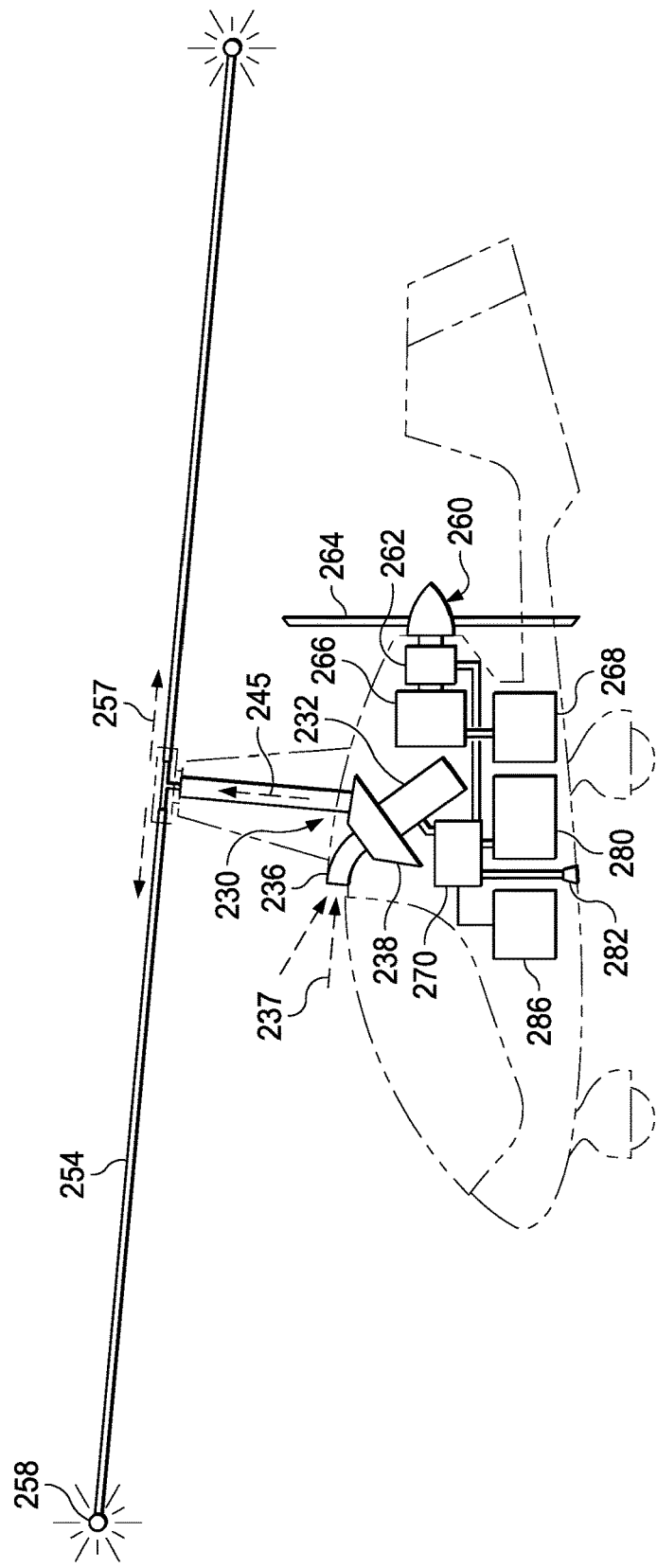
FIG. 3 is a schematic side view of a rotorcraft, according to one example embodiment.

FIG. 3 is another example of the rotorcraft 100. Certain components of the rotorcraft 100 are as described above. Those components bear similar reference characters to the components of the rotorcraft 100, but with a leading '2' rather than a leading '1'. The second electric propulsion system 260 can further include a combustion engine 266 and a fuel tank 268. The combustion engine 266 is in mechanical communication with the second electric motor 262 and propeller 264. The combustion engine 266 is a 65 horsepower Rotax 582 UL manufactured by BRP-Rotax. The fuel tank 268 is stationary and located in the fuselage 202. A fuel pump can be provided to pump fuel from the fuel tank 268 to the combustion engine 266. In some embodiments, a gearbox, for example, but not limitation, a one way clutch, is in mechanical communication with the combustion engine 266 and the second electric motor 262. The second electric propulsion system 260 is a hybrid embodiment that utilizes both thermal fuel burning engine 266 and the electric motor 262 to directly drive the propeller 264 forward in a flight mode 194.

In vertical takeoff mode 190, the EPCU 270 monitors and controls power to the first and second propulsion systems 230 and 260 for takeoff. The first electric motor 232 operates at a high speed to power the air compressor 234 and ultimately force compressed air out of the tip jets 258. In one embodiment, both the first and second propulsion systems 230 and 260 can be operated during takeoff. The combustion engine 266 is operated and the air compressor 234 is operated during takeoff to a very high vertical rate of climb (VROC) as there is enough power to sustain VROC.

During cruise mode 194, the combustion engine 266 is engaged and the electric motor 262 operates as a generator to recharge battery 280. An embodiment provides a charging unit 286 that can charge the battery 280. One benefit to operating the combustion engine 266 during flight is that the battery 280 can be charged during flight and may not be required to be recharged on the ground, which can avoid increasing turnaround times or requiring physically swapping out battery 280.

In one embodiment, the lift or forward thrust needed for a flight mode of the rotorcraft 100 is only achieved by at least one of the first electric propulsion system 130 and second electric propulsion system 160. In another embodiment, the lift or forward thrust needed for a flight mode of the rotorcraft 100 is only achieved by the tail member 116 and at least one of the first electric propulsion system 130 and second electric propulsion system 160. In an example, the rotorcraft 100 does not include wings extending from the sides surfaces 112 and 114 for lift or forward thrust. In another example, the rotorcraft includes a wing extending from each of the side surfaces 112 and 114 to prow de lift and forward thrust.

Teachings of certain embodiments relating to rotorcraft 100 described herein can apply to aircraft having a total gross weight from about greater than 500 lbs and less than 3,000 lbs. In other embodiments relating to rotorcraft 100 described herein the total gross weight of the aircraft can be from about 1,000 to about 3,000 lbs.

In an embodiment, the cabin 107 accommodates from about 3 to about 4 passengers. In other embodiments, the cabin 107 accommodates from about 1 to about 2 passengers. In yet other embodiments, the cabin 107 accommodates 1 passenger. In still another embodiment, the cabin 107 is unmanned. In yet still another embodiment, the cabin 107 accommodates cargo.

An embodiment provides the rotorcraft 100 without a tail rotor. A tail rotor requires a substantial amount of power during operation, which would reduce the energy resources and limit flight range.

The illustrative embodiments of the rotorcraft described herein can advantageously provide an efficient, lightweight, low cost, and safe rotorcraft with redundant propulsion systems. In one embodiment, the rotorcraft configuration with two electric propulsion systems has a reduced power need for flight as compared to conventional rotorcraft, which can result in an extended range or a smaller battery can be used. The first propulsion system is a cold flow tip jet system that only expels compressed air from the tip jets and does not use fuel combustion, which limits environmental noise and carbon emissions as compared to tip jets using fuel combustion. Another advantage is that some embodiments can be landed on small airstrips and require less than 100 feet of a landing strip.

At least one embodiment is disclosed and variations, combinations, and/or modifications of the embodiment(s) and/or features of the embodiment(s) made by a person having ordinary skill in the art within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

The invention claimed is:

1. A rotorcraft capable of a hover mode and a forward cruise mode comprising:
    a fuselage having a top surface and a rear end;
    a first electric propulsion system comprising:
        an air compressor, the air compressor having an inlet for receiving ambient air and an outlet for releasing compressed air;
        a first electric motor configured to drive the air compressor, the first electric motor comprises a high speed electric motor that operates from about 30,000 to about 40,000 RPM;
        a pair of rotor blades disposed above the top surface of the fuselage, the rotor blades comprising a hollow portion; and
        a conduit in fluid communication with the air compressor outlet and the hollow portion of the rotor blades;
        wherein the compressed air flows from the air compressor outlet into the conduit and into the hollow portion of the rotor blades, the compressed air is discharged from the hollow portion of the rotor blades to impart rotation thereon during hover mode;
    a second electric propulsion system comprising:
        a propeller disposed in the rear end of the fuselage; and
        a second electric motor configured to drive the propeller, the second electric motor comprises a low speed electric motor that operates from greater than 0 to about 10,000 RPM; and
    an electric power control unit to control power to the first and second electric propulsion systems in the hover and forward cruise modes.

2. The rotorcraft of claim 1, wherein the air compressor is disposed adjacent to the top surface of the fuselage.

3. The rotorcraft of claim 1, wherein the hollow portion of the pair of rotor blades receives only compressed air during operation of the first electric propulsion system.

4. The rotorcraft of claim 1, wherein the electric power control unit provides more power to the first electric propulsion system during the hover mode as compared to the second electric propulsion system.

5. The rotorcraft of claim 1, wherein the electric power control unit provides more power to the second electric propulsion system during the cruise mode as compared to the first electric propulsion system.

6. The rotorcraft of claim 1, wherein the electric power control unit provides all power to the second electric propulsion system.

7. The rotorcraft of claim 1, wherein lift for a flight mode is achieved only by at least one of the first electric propulsion system and the second electric propulsion system.

8. The rotorcraft of claim 1, further comprising:
    a hollow rotating hub in fluid communication with the conduit and the hollow portion of the pair of rotor blades.

9. The rotorcraft of claim 8, wherein the hollow rotating hub is a pneumatic slip ring.

10. The rotorcraft of claim 1, further comprising:
    a battery in electrical communication with the electric power control unit, and
    an electric power connector disposed on the fuselage, the electrical power connector configured to receive electrical current from an independent power source to charge the battery.

11. The rotorcraft of claim 10, wherein the electric power connector is a quick release power connector that is controlled remotely for disconnection from the independent power source.

12. The rotorcraft of claim 10, wherein the electric power connector is connected to the independent power source while the pair of rotor blades are rotating.

13. The rotorcraft of claim 1, wherein the second electric propulsion system further comprises:
    a combustion engine in mechanical communication with the second electric motor and the propeller.

14. The rotorcraft of claim 13, wherein the electric power control unit provides power to the first electric propulsion system and the combustion engine during the hover mode.

15. A method of controlling a rotorcraft, the rotorcraft comprising:
    a fuselage having a top surface and a rear end;
    a first electric propulsion system comprising;
    a tip jet flow system that imparts rotation on a pair of rotor blades disposed above the top surface of the fuselage; and
    a first electric motor configured to drive the tip jet cold flow system, the first electric motor comprising a high speed electric motor that operates from about 30,000 to about 40,000 RPM;
    a second electric propulsion system comprising:
    a propeller disposed in the rear end of the fuselage; and
    a second electric motor configured to drive the propeller, the second electric motor comprising a low speed electric motor that operates from greater than 0 to about 10,000 RPM; and
    the method comprising:
    a hovering mode, in which the lift of the rotorcraft is generated by the first electric propulsion system and the yaw position of the rotorcraft is controlled by the second electric propulsion system, and a cruising mode, in which the forward thrust of the rotorcraft is generated by the second electric propulsion system and at least in part by an autogyro motion of the pair of rotor blades.

16. The method of claim 15, further comprising a descent mode, in which the lift of the rotorcraft is generated by the first electric propulsion system, the yaw position of the rotorcraft is controlled by the second electric propulsion system, and at least in part by an autogyro motion of the pair of rotor blades.

17. The method of claim 15, wherein the rotorcraft further comprises:
    a battery for providing power to the first and second electric propulsion systems, and
    an electric power control unit to control power from the battery to the first and second electric propulsion systems in the hovering and cruising modes.

18. The method of claim 17, wherein the hovering mode further comprises a vertical takeoff mode comprising:
    providing power to the first electric propulsion system from an independent power source and charging the battery while the rotorcraft is on the ground.

19. The method of claim 15, wherein the second electric propulsion system further includes a combustion engine in mechanical communication with the second electric motor and the propeller.

20. The method of claim 19, further comprising a vertical takeoff mode, in which the lift of the rotorcraft is generated by the first electric propulsion system and the second electric propulsion system, and the yaw position of the rotorcraft is controlled by the second electric propulsion system.

\* \* \* \* \*